United States Patent
Janitch

(10) Patent No.: US 9,151,838 B2
(45) Date of Patent: Oct. 6, 2015

(54) CERAMIC PROBE ROD SUPPORT ASSEMBLY

(71) Applicant: Magnetrol International, Incorporated, Downers Grove, IL (US)

(72) Inventor: Paul G. Janitch, Lisle, IL (US)

(73) Assignee: Magnetrol International, Inc., Aurora, IL (US)

( * ) Notice: Subject to any disclaimer, the term of this patent is extended or adjusted under 35 U.S.C. 154(b) by 469 days.

(21) Appl. No.: 13/667,223

(22) Filed: Nov. 2, 2012

(65) Prior Publication Data

US 2014/0125512 A1    May 8, 2014

(51) Int. Cl.
| | | |
|---|---|---|
| *G01F 23/28* | (2006.01) | |
| *G01S 13/88* | (2006.01) | |
| *G01F 23/284* | (2006.01) | |
| *G01S 13/10* | (2006.01) | |

(52) U.S. Cl.
CPC ............... *G01S 13/88* (2013.01); *G01F 23/284* (2013.01); *G01S 13/10* (2013.01)

(58) Field of Classification Search
None
See application file for complete search history.

(56) References Cited

U.S. PATENT DOCUMENTS

| | | | | |
|---|---|---|---|---|
| 4,507,521 A | * | 3/1985 | Goellner | 174/151 |
| 5,304,985 A | * | 4/1994 | Cosser | 340/620 |
| 7,467,548 B2 | | 12/2008 | Fredriksson | |

* cited by examiner

*Primary Examiner* — Robert R Raevis
(74) *Attorney, Agent, or Firm* — Wood, Phillips, Katz, Clark & Mortimer

(57) ABSTRACT

A probe for use with a measurement instrument includes a circuit connected to the probe. The probe comprises a process adaptor for mounting to a process vessel and including a through bore extending from a connector end to a process end. A counterbore at the connector end defines a shoulder. A support assembly is received in the counterbore and rests on the shoulder. The support assembly comprises an annular rod support having a through opening with a tension rod extending through the opening and secured at opposite sides of the annular rod support. A locking nut secures the support assembly in the counterbore to maintain the annular rod support in compression. A probe rod extends from a process end of the tension rod. A seal assembly is operatively secured to the process adaptor at the connector end with the seal pin in electrical contact with a connector end of the tension rod.

20 Claims, 5 Drawing Sheets

CERAMIC PROBE ROD SUPPORT ASSEMBLY

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to process control instruments, and more particularly, to a guided wave radar probe with a ceramic probe rod support assembly.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

Knowledge of level in industrial process tanks or vessels has long been required for safe and cost-effective operation of plants. Many technologies exist for making level measurements. These include buoyancy, capacitance, ultrasonic and microwave radar, to name a few. Recent advances in micropower impulse radar (MIR), also known as ultra-wideband (UWB) radar, in conjunction with advances in equivalent time sampling (ETS), permit development of low power and low cost time domain reflectometry (TDR) instruments.

In a TDR instrument, a very fast pulse with a rise time of 500 picoseconds, or less, is propagated down a probe, that serves as a transmission line, in a vessel. The pulse is reflected by a discontinuity caused by a transition between two media. For level measurement, that transition is typically where the air and the material to be measured meet. These instruments are also known as guided wave radar (GWR) measurement instruments.

In one form, a guided wave radar (GWR) transmitter uses a coaxial probe that functions as an electrical transmission line into the process vessel. The GWR measurement process begins with an electrical pulse that is launched along the probe from one end. A TDR circuit identifies impedance discontinuities along the length of the probe. One source of an impedance discontinuity occurs at the vapor to liquid interface due to the difference in the relative dielectrics of the media. The TDR circuit detects, and locates in time, the reflected signal from the interface. Another source of an impedance discontinuity can be a change in geometry in the transmission line. This is a convenient method for producing a known reference location, called a fiducial (FID) in the probe. The difference in the TDR time measurements of the fiducial to the vapor to liquid interface is used to calculate the liquid level. Another impedance discontinuity exists at the end of the probe (EOP). With this type of probe and TDR circuit an increased impedance creates a positive reflected signal.

In high pressure and high temperature applications, the probe may include a small glass or ceramic seal. The seal has a small pin of approximately 1 mm diameter as an inner conductor. The pin is not capable of supporting a probe rod. Therefore, the probe rod must be supported by other structure using electrical insulating materials to function as a transmission line.

Known probes use a flexible coupling system to take up deflection due to loads on the probe rod to reduce stresses in the seal. Known flexible coupling systems require disk springs, ceramic disks, and a collar on a probe rod which is clamped between the ceramic disks. A disadvantage of ceramic materials is that they are typically brittle and have relatively low tensile strength.

The present invention is directed to solving one or more of the problems discussed above in a novel and simple manner.

SUMMARY

As described herein, a process instrument includes a ceramic probe rod support assembly.

There is disclosed in accordance with one aspect of the invention a probe for use with a measurement instrument including a circuit connected to the probe. The probe comprises a process adaptor for mounting to a process vessel and including a throughbore extending from a connector end to a process end. A counterbore at the connector end defines a shoulder. A support assembly is received in the counterbore and rests on the shoulder. The support assembly comprises an annular rod support having a through opening with a tension rod extending through the opening and secured at opposite sides of the annular rod support. A nut secures the support assembly in the counterbore to maintain the annular rod support in compression. A probe rod extends from a process end of the tension rod. A seal assembly is operatively secured to the process adaptor at the connector end with the seal pin in electrical contact with a connector end of the tension rod.

It is a feature of the invention that the annular rod support is formed of a ceramic material, such as alumina.

It is another feature that the probe rod assembly includes mica disks on opposite sides of the annular rod support.

It is a further feature that the tension rod includes an enlarged head at the connector end and a threaded connector at the process end.

It is a further feature that the enlarged head includes a press-in contact for connection to the seal pin.

It is yet another feature to provide a dielectric insert between the support assembly and the locking nut.

Other features and advantages will be apparent from a review of the entire specification, including the appended claims and drawings.

DETAILED DESCRIPTION

Figure 1:
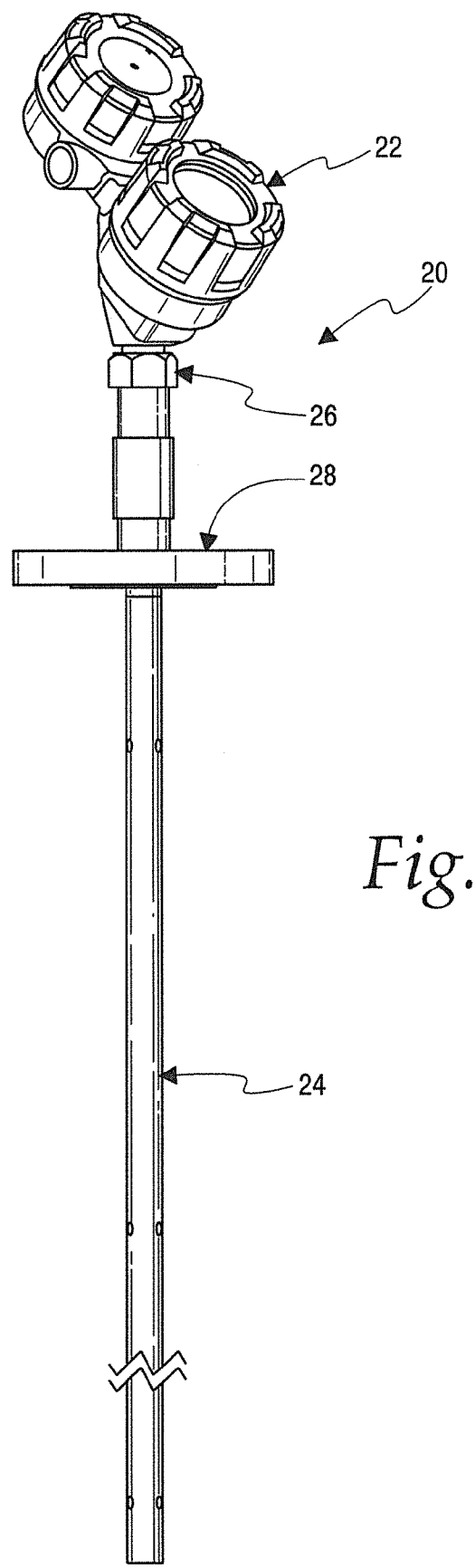
FIG. 1 is an elevation view of a guided wave radar instrument including a probe with a ceramic probe rod support assembly in accordance with the invention.

Referring to FIG. 1, a process instrument 20 is illustrated. The process instrument 20 uses pulsed radar in conjunction with equivalent time sampling (ETS) and ultra-wide band (UWB) transceivers for measuring level using time domain reflectometry (TDR). Particularly, the instrument 20 uses guided wave radar for sensing level. While the embodiment described herein relates to a guided wave radar level sensing apparatus, various aspects of the invention may be used with other types of process instruments for measuring various process parameters.

The process instrument 20 includes a control housing 22, a probe 24, and a connector 26 for connecting the probe 24 to the housing 22. The probe 24 is mounted to a process vessel (not shown) using a flange 28. The housing 22 is then secured to the probe 24 as by threading the connector 26 to the probe 24 and also to the housing 22. The probe 24 comprises a high frequency transmission line which, when placed in a fluid, can be used to measure level of the fluid. Particularly, the probe 24 is controlled by a controller 30, described below, in the housing 22 for determining level in the vessel.

As described more particularly below, the controller 30 generates and transmits pulses on the probe 24. A reflected signal is developed off any impedance changes, such as the liquid surface of the material being measured. A small amount of energy may continue down the probe 24.

Guided wave radar combines TDR, ETS and low power circuitry. TDR uses pulses of electromagnetic (EM) energy to measure distance or levels. When a pulse reaches a dielectric discontinuity then a part of the energy is reflected. The greater the dielectric difference, the greater the amplitude of the reflection. In the measurement instrument 20, the probe 24 comprises a wave guide with a characteristic impedance in air. When part of the probe 24 is immersed in a material other than air, there is lower impedance due to the increase in the dielectric. When the EM pulse is sent down the probe it meets the dielectric discontinuity, a reflection is generated.

ETS is used to measure the high speed, low power EM energy. The high speed EM energy (1000 foot/microsecond) is difficult to measure over short distances and at the resolution required in the process industry. ETS captures the EM signals in real time (nanoseconds) and reconstructs them in equivalent time (milliseconds), which is much easier to measure. ETS is accomplished by scanning the wave guide to collect thousands of samples. Approximately eight scans are taken per second.

Figure 2:
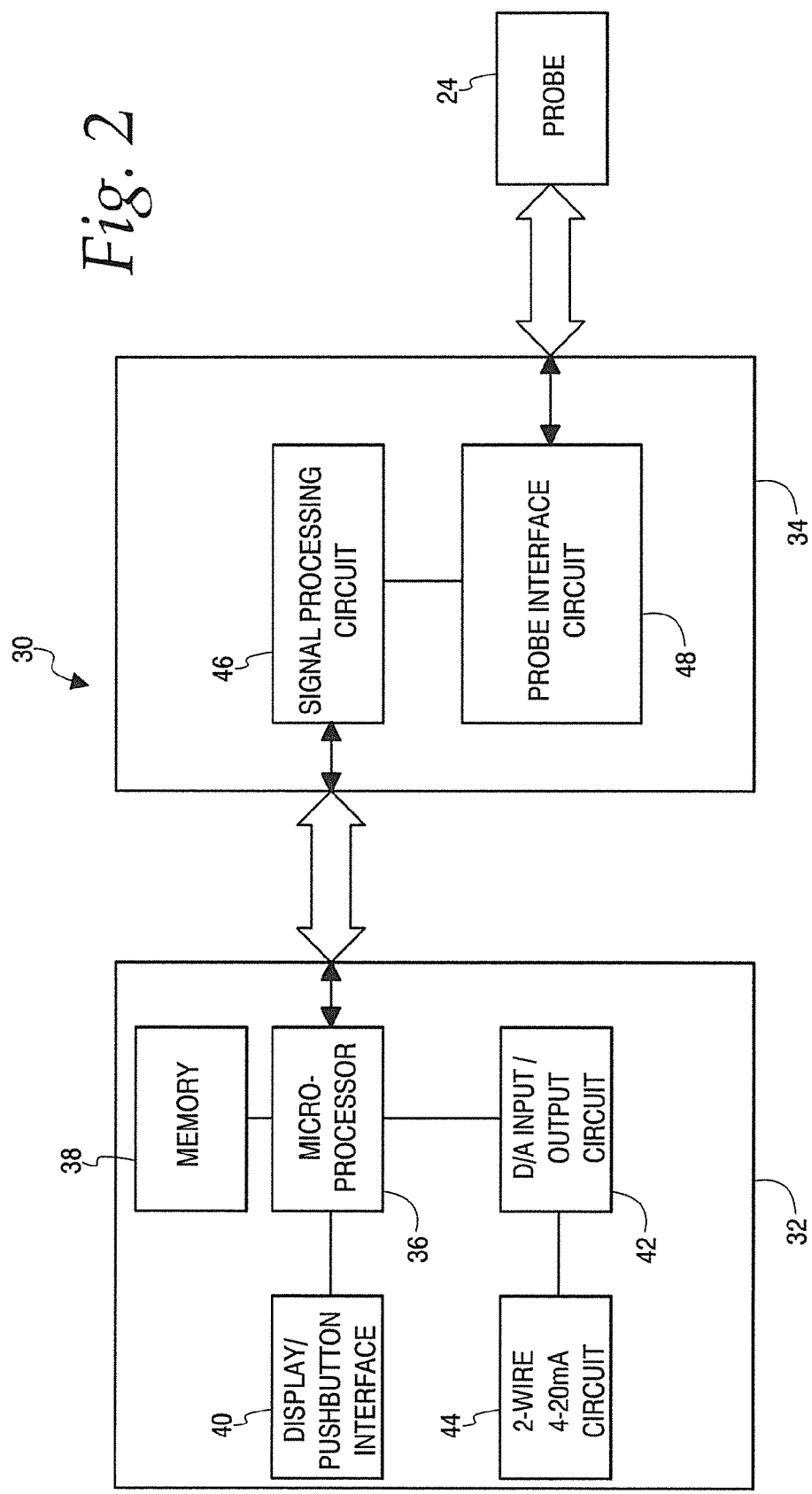
FIG. 2 is a block diagram of the transmitter of FIG. 1.

Referring to FIG. 2, the electronic circuitry mounted in the housing 22 of FIG. 1 is illustrated in block diagram form as an exemplary controller 30 connected to the probe 24. As will be apparent, the probe 24 could be used with other controller designs. The controller 30 includes a digital circuit 32 and an analog circuit 34. The digital circuit 32 includes a microprocessor 36 connected to a suitable memory 38 (the combination forming a computer) and a display/push button interface 40. The display/push button interface 40 is used for entering parameters with a keypad and displaying user and status information. The memory 38 comprises both non-volatile memory for storing programs and calibration parameters, as well as volatile memory used during level measurement. The microprocessor 36 is also connected to a digital to analog input/output circuit 42 which is in turn connected to a two-wire circuit 44 for connecting to a remote power source. Particularly, the two-wire circuit 44 utilizes loop control and power circuitry which is well known and commonly used in process instrumentation. The two-wire circuit 44 controls the current on the two-wire line in the range of 4-20 mA which represents level or other characteristics measured by the probe 24.

The microprocessor 36 is also connected to a signal processing circuit 46 of the analog circuit 34. The signal processing circuit 46 is in turn connected via a probe interface circuit 48 to the probe 24. The probe interface circuit 48 includes an ETS circuit which converts real time signals to equivalent time signals, as discussed above. The signal processing circuit 46 processes the ETS signals and provides a timed output to the microprocessor 36, as described more particularly below.

The general concept implemented by the ETS circuit is known. The probe interface circuit 48 generates hundreds of thousands of very fast pulses of 500 picoseconds or less rise time every second. The timing between pulses is tightly controlled. The reflected pulses are sampled at controlled intervals. The samples build a time multiplied "picture" of the reflected pulses. Since these pulses travel on the probe 24 at the speed of light, this picture represents approximately ten nanoseconds in real time for a five-foot probe. The probe interface circuit 48 converts the time to about seventy-one milliseconds. As is apparent, the exact time would depend on various factors, such as, for example, probe length. The largest signals have an amplitude on the order of twenty millivolts before amplification to the desired amplitude by common audio amplifiers. For a low power device, a threshold scheme is employed to give interrupts to the microprocessor 36 for select signals, namely, fiducial, target, level, and end of probe, as described below. The microprocessor 36 converts these timed interrupts into distance. With the probe length entered through the display/push button interface 40, or some other interface, the microprocessor 36 can calculate the level by subtracting from the probe length the difference between the fiducial and level distances. Changes in measured location of the reference target can be used for velocity compensation, as necessary or desired.

Figure 3:
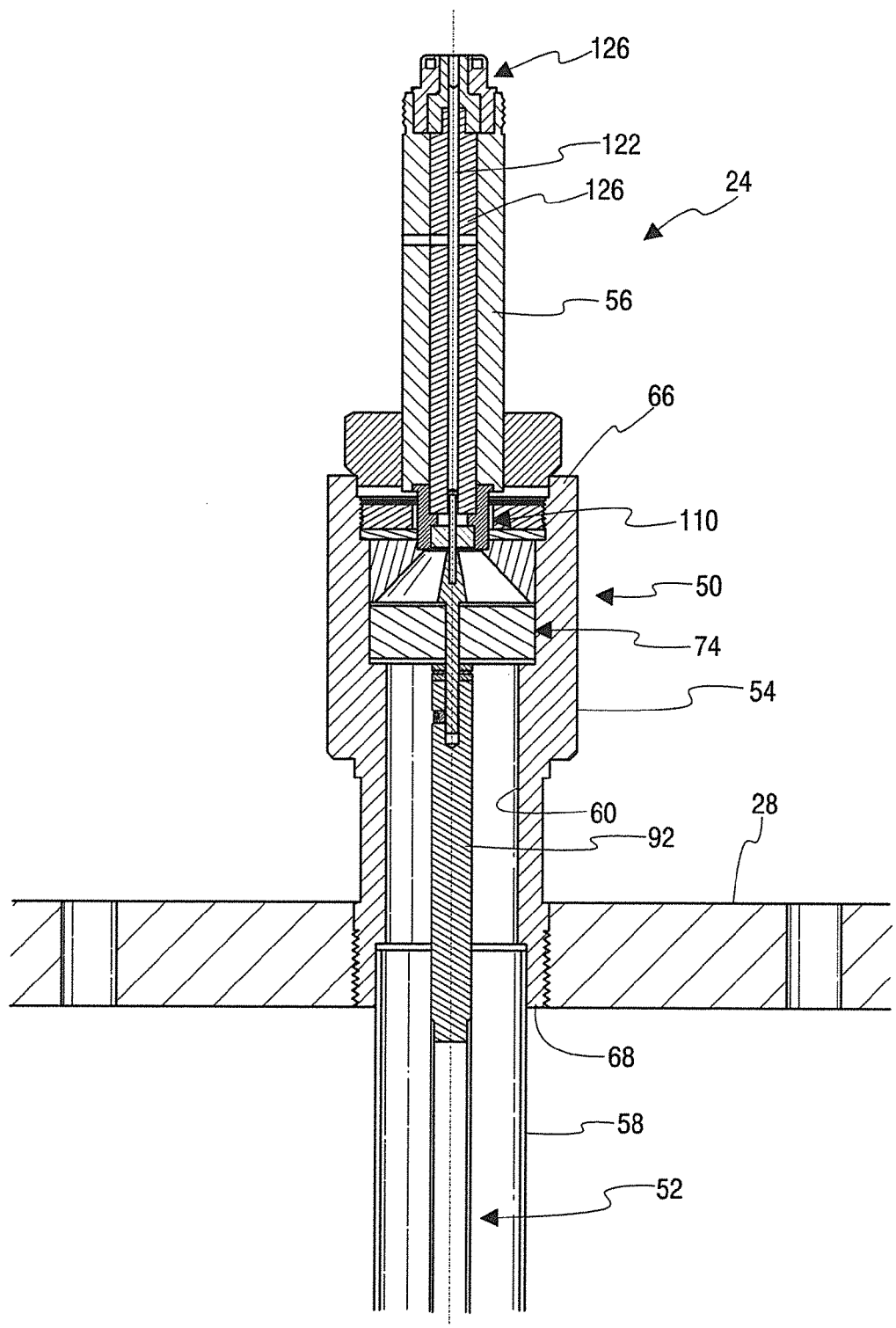
FIG. 3 is a partial sectional view of the probe of FIG. 1.
Figure 4:
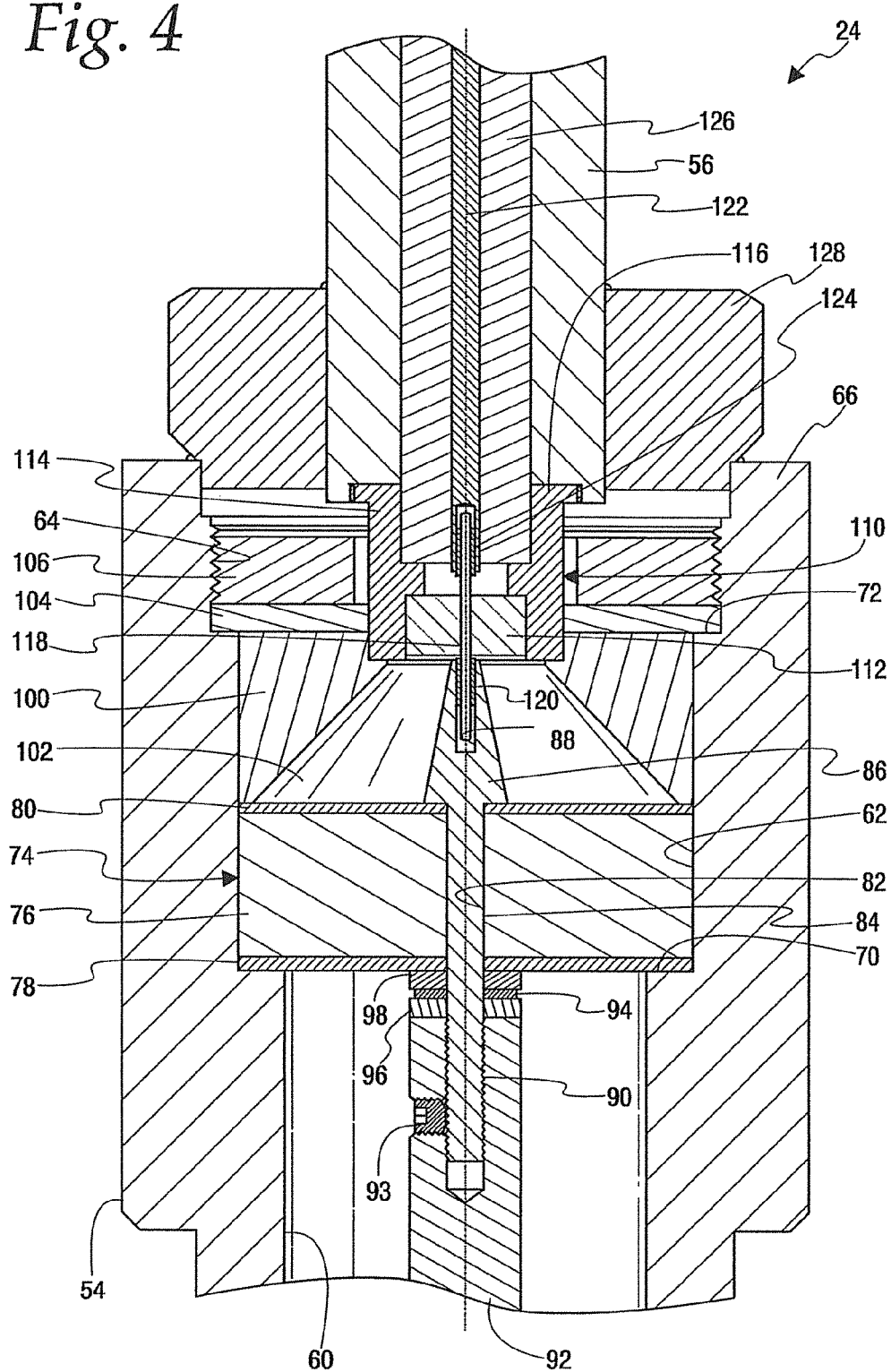
FIG. 4 is a detailed view of probe rod support structure.

Referring to FIGS. 3 and 4, the probe 24 includes a conductive outer sleeve 50 and a center conductor 52 coaxial with the outer sleeve 50 for conducting the pulses.

While the illustrated probe is described in connection with a GWR measurement instrument, the seal and probe support system used therewith can be used with any form of tank measurement instrument, including temperature, pressure, density, flow and level measurement, that requires a signal or power transmission into a sealed process vessel. Exemplary technologies include, GWR, through air radar, capacitance and thermistor.

The conductive outer sleeve 50 is of multi-part construction and includes a process adaptor 54, a probe extension sleeve 56 and a process tube 58. These may all be formed of stainless steel. The process adaptor 54 is generally cylindrical and includes a cylindrical through bore 60. The through bore 60 includes a first counterbore 62, of a first diameter greater than a diameter of the through bore 60, and a second counterbore 64, of a second diameter greater diameter than the first diameter, at a connector end 66. The process tube 58 is welded to the process adaptor 54 at a process end 68 and is of a length dependent on the height of the process vessel. With a single rod probe the process tube 58 will be omitted.

The process adaptor first counterbore 62 defines a first shoulder 70 facing the connector end 66. Similarly, the second counterbore 64 defines a second shoulder 72 also facing the connector end 66. The second counterbore 64 is threaded, as illustrated.

Figure 5:
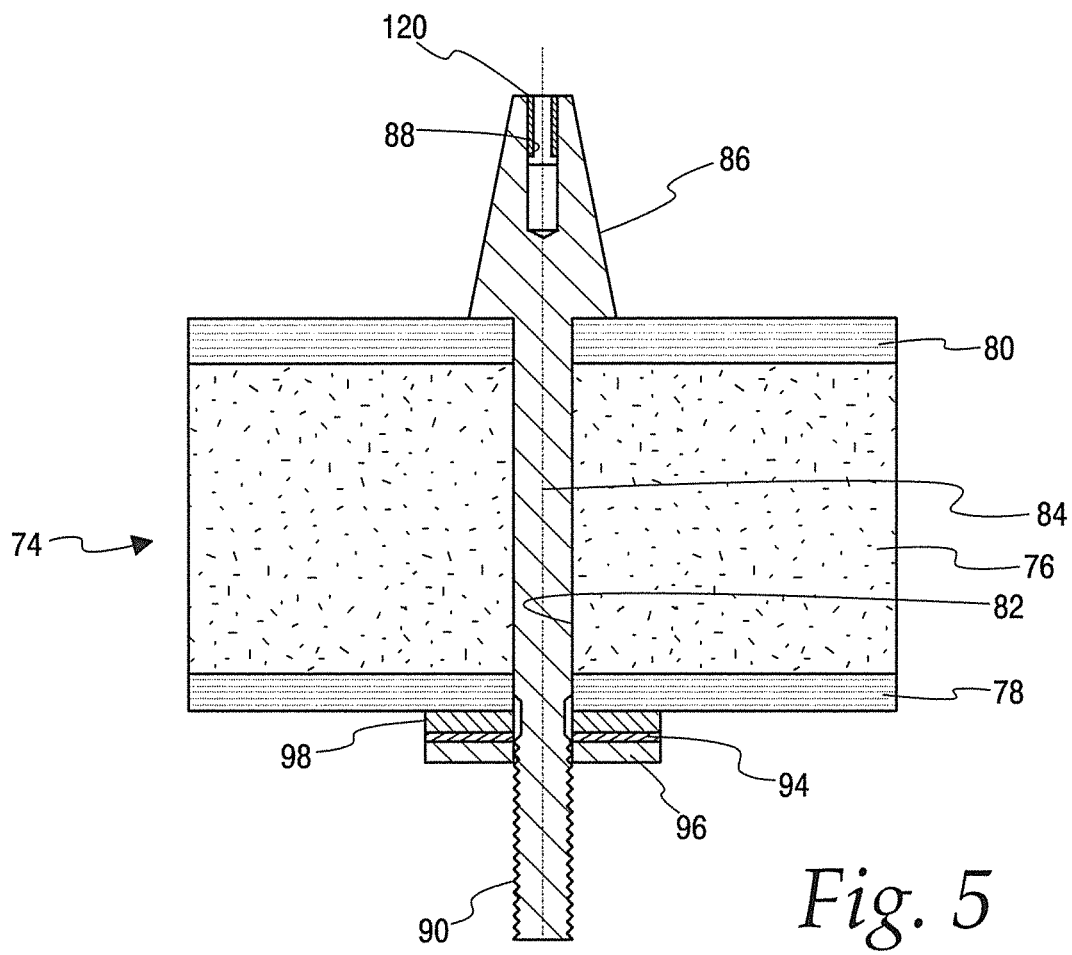
FIG. 5 is a partial section of the ceramic probe rod support assembly.
Figure 6:
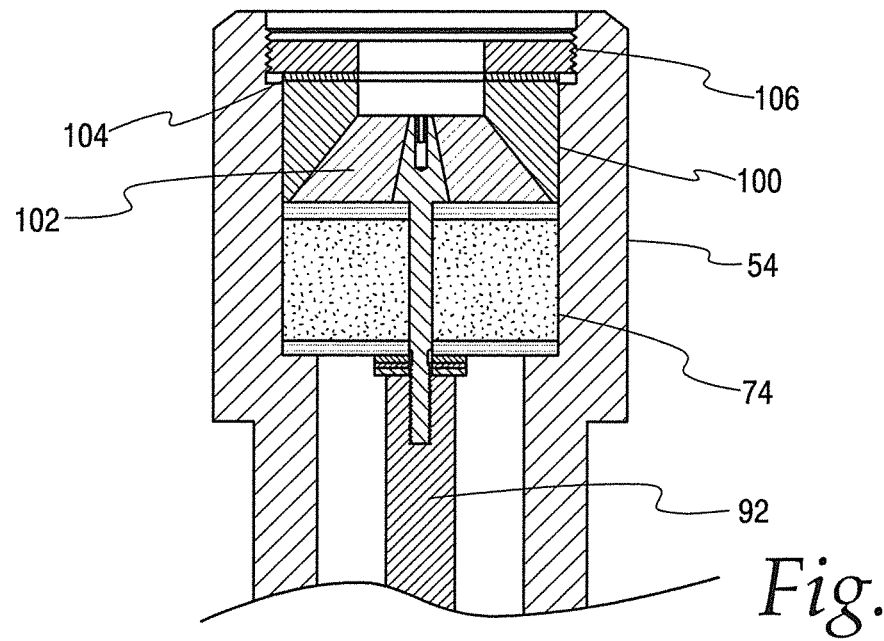
FIG. 6 is a partial section of the ceramic probe rod support assembly mounted in a process adaptor.

A probe rod support assembly 74, see also FIG. 5, is received in the first counterbore 62 and rests on the first shoulder 70, see also FIG. 6. The probe rod support assembly 74 comprises an annular rod support 76 sandwiched between mica disks 78 and 80. The annular rod support 76 includes a through opening 82. A tension rod 84 extends through the opening 82. The tension rod 84 includes an enlarged head 86 at a connector end and having a blind bore 88. A process end of the tension rod 84 is threaded as at 90.

A probe rod 92, forming part of the center conductor 52, is threaded to the tension rod threaded end 90 and secured in place using a set screw 93. A disk spring washer 94, such as a Bellville washer, is sandwiched between annular washers 96 and 98 between the mica disk 78 and the probe rod 92.

A conical washer 100 is positioned in the first counterbore 62 and presses on the mica disk 80 of the probe rod support assembly 74. A PEEK plastic dielectric insert 102 is received in the conical washer 100 to provide impedance matching. An annular washer 104 is atop the conical washer 100 and a locking nut 106 is received in the threaded second counterbore 64 to tighten against the conical washer to maintain the probe rod support assembly 74 in compression between the shoulder 70 and the locking nut 106.

A seal assembly 110 provides a high temperature, high pressure seal of the process vessel. The seal assembly 110 comprises an annular seal element 112 received in a tubular metal body 114. A flange 116 extends outwardly from the metal body 114 at the connector end which is welded to the probe extension 56.

The seal assembly 110 is formed by positioning a seal pin 118 coaxially in the metal body 114 using an appropriate fixture (not shown). The seal material 112 in the form of a molten glass, ceramic, or a glass ceramic mixture, or the like is poured into the metal body 114 to form an annular body resting on a shoulder. Upon hardening, the seal element 112 provides a hard seal which is bonded to the metal of the tubular metal body 114 and the seal pin 118 and provides a hermetic seal.

The seal pin 118 is received in the tension rod blind bore 88 and is secured thereto using a press-in electrical contact 120. Similarly, at an opposite end the seal pin 118 is secured to an electrical conductor 122 via a press-in electrical contact 124 to provide connection to a connector terminal 126, see FIG. 3. The electrical conductor 122 is received in a dielectric insert 126 in the probe extension 56. A coupling 128 is welded to the probe extension 56 and the process adaptor 54 to secure the probe extension 56 to the process adaptor 54.

As described, the probe rod support assembly 74 uses the annular rod support 76. The rod support 76 may be of a ceramic material, such as alumina. Ceramics provide an excellent high temperature, electrically insulating material suitable for supporting the probe rod 92. Ceramics possess high compressive strength. The probe rod support assembly 74 takes advantage of the high compressive strength of ceramic. Particularly, as described, the tension rod 84 passes through the center of a ceramic disk in the form of the annular rod support 76. The probe rod 92 is threaded onto the tension rod 84 and is locked in place with the disk spring washer 94. The parts are tightened until the disk spring washer 94 is flat. The disk spring washer 94 maintains tension in the tension rod 84. The resultant forces on the ceramic disk 76 from the clamped tension rod 84 are in compression. The ceramic disk 76 is then installed between a step in the process adaptor 54 formed by the first shoulder 70 and the threaded lock nut 106. The resultant forces on the ceramic disk 76 due to the lock nut 106 are also in compression.

The constraints on the ceramic disk 76 create biased compressive stresses in the ceramic material. Despite the variety of possible loads on the probe rod 92, such as bending, tensile or torque, the resultant stresses on the ceramic disk 76 are generally compressive.

The press-in spring contact 120 is used to make electrical contact between the tension rod 84 and the seal pin 118. This mechanically isolates the small seal pin 118 from the probe loads.

Thin disks 78 and 80 of a softer high temperature material, such as mica, are used to eliminate point contact between the ceramic disk 76 and the metal process adaptor 54, thereby eliminating high stress concentrations in the ceramic disk 76.

Thus, in accordance with the invention, an improved process instrument probe which is used for industrial process level measurement in high temperature and high pressure environments employs a substantially improved ceramic probe rod support assembly.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A probe for use with a measurement instrument including a circuit connected to the probe, the probe comprising:
 a process adapter for mounting to a process vessel and including a through bore extending from a connector end to a process end, and a counterbore at the connector end defining a shoulder;
 a support assembly received in the counterbore and resting on the shoulder, comprising an annular rod support having a through opening with a tension rod extending through the opening and secured at opposite sides of the annular rod support;
 an externally threaded locking ring securing the support assembly in the counterbore to maintain the annular rod support in compression;
 a probe rod extending from a process end of the tension rod; and
 a seal assembly including a seal pin operatively secured to the process adaptor at the connector end with the seal pin in electrical contact with a connector end of the tension rod.

2. The probe of claim 1 wherein the annular rod support is formed of a ceramic material.

3. The probe of claim 1 wherein the annular rod support is formed of alumina.

4. The probe of claim 1 wherein the support assembly includes mica disks on opposite sides of the annular rod support.

5. The probe of claim 1 wherein the tension rod includes an enlarged head at the connector end and a threaded connector at the process end.

6. The probe of claim 5 wherein the enlarged head includes a press-in contact for connection to the seal pin.

7. The probe of claim 1 further comprising a dielectric material disposed between the support assembly and the seal assembly.

8. A probe for use with a measurement instrument including a circuit connected to the probe, the probe comprising:

a process adapter for mounting to a process vessel and including a through bore extending from a connector end to a process end, and a counterbore at the connector end defining a shoulder;

a support assembly received in the counterbore and resting on the shoulder, comprising an annular rod support having a through opening with a tension rod extending through the opening and secured at opposite sides of the annular rod support to maintain the annular rod support in compression;

an externally threaded locking ring securing the support assembly in the counterbore;

a probe rod extending from a process end of the tension rod; and a seal assembly including a seal pin operatively secured to the process adaptor at the connector end with the seal pin in electrical contact with a connector end of the tension rod.

9. The probe of claim 8 wherein the annular rod support is formed of a ceramic material.

10. The probe of claim 8 wherein the annular rod support is formed of alumina.

11. The probe of claim 8 wherein the support assembly includes mica disks on opposite sides of the annular rod support.

12. The probe of claim 8 wherein the tension rod includes an enlarged head at the connector end and a threaded connector at the process end.

13. The probe of claim 12 wherein the enlarged head includes a press-in contact for connection to the seal pin.

14. The probe of claim 8 further comprising a dielectric material disposed between the support assembly and the seal assembly.

15. A probe for use with a measurement instrument including a circuit connected to the probe, the probe comprising:

a process adapter for mounting to a process vessel and including a through bore extending from a connector end to a process end, and a counterbore at the connector end defining a shoulder;

a support assembly received in the counterbore and resting on the shoulder, comprising an annular rod support having a through opening with a tension rod extending through the opening and secured at opposite sides of the annular rod support to maintain the annular rod support in compression;

an externally threaded locking ring securing the support assembly in the counterbore to maintain the annular rod support in compression;

a probe rod extending from a process end of the tension rod; and a seal assembly including a seal pin operatively secured to the process adaptor at the connector end with the seal pin in electrical contact with a connector end of the tension rod.

16. The probe of claim 15 wherein the annular rod support is formed of a ceramic material.

17. The probe of claim 15 wherein the support assembly includes mica disks on opposite sides of the annular rod support.

18. The probe of claim 15 wherein the tension rod includes an enlarged head at the connector end and a threaded connector at the process end.

19. The probe of claim 18 wherein the enlarged head includes a press-in contact for connection to the seal pin.

20. The probe of claim 19 further comprising a dielectric material disposed between the support assembly and the seal assembly.

* * * * *